US012429101B2

(12) United States Patent
Kim

(10) Patent No.: US 12,429,101 B2
(45) Date of Patent: Sep. 30, 2025

(54) BRAKE APPARATUS FOR VEHICLE

(71) Applicant: HYUNDAI MOBIS CO., LTD., Seoul (KR)

(72) Inventor: Hyeong Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 527 days.

(21) Appl. No.: 17/846,299

(22) Filed: Jun. 22, 2022

(65) Prior Publication Data

US 2022/0412415 A1 Dec. 29, 2022

(30) Foreign Application Priority Data

Jun. 23, 2021 (KR) .................. 10-2021-0081590

(51) Int. Cl.
| | | |
|---|---|---|
| *F16D 55/227* | (2006.01) | |
| *B60T 1/06* | (2006.01) | |
| *F16D 55/00* | (2006.01) | |
| *F16D 65/00* | (2006.01) | |

(52) U.S. Cl.
CPC ............ *F16D 55/227* (2013.01); *B60T 1/065* (2013.01); *F16D 65/0075* (2013.01); *F16D 2055/002* (2013.01)

(58) Field of Classification Search
CPC ........ B60T 1/065; B60T 1/005; B60T 13/741; B60T 13/746; F16D 55/02; F16D 55/24; F16D 55/226; F16D 55/227; F16D 65/02; F16D 65/0068; F16D 65/0075; F16D 65/183; F16D 65/18; F16D 2055/002; F16D 2121/24; F16D 2125/40; F16D 2125/48; F16D 2127/06
USPC ....................................... 188/73.45
See application file for complete search history.

(56) References Cited

U.S. PATENT DOCUMENTS

| | | | |
|---|---|---|---|
| 5,785,156 A * | 7/1998 | Warwick ............... | F16D 55/227 188/73.32 |
| 9,989,112 B1 * | 6/2018 | Lethorn ............... | F16D 65/0068 |
| 2013/0126280 A1 * | 5/2013 | Gutelius ........... | F16D 55/22655 188/219.1 |
| 2014/0374198 A1 * | 12/2014 | Nishii ................... | F16D 55/227 188/73.37 |
| 2021/0148421 A1 * | 5/2021 | Ahn ....................... | F16D 55/02 |

FOREIGN PATENT DOCUMENTS

KR  10-2017-0046908 A  5/2017

* cited by examiner

*Primary Examiner* — Robert A. Siconolfi
*Assistant Examiner* — San M Aung
(74) *Attorney, Agent, or Firm* — Novo TechIP International PLLC

(57) ABSTRACT

A brake apparatus for a vehicle may include: a torque member having a pair of brake pads installed therein and spaced apart from each other, and configured to surround a brake disk; a caliper configured to cover the torque member, and having a gravitational center adjuster configured to adjust the position of a gravitational center toward the brake disk; a pair of guide rods configured to connect the torque member and the caliper, such that the caliper is slidably coupled to the torque member; and an actuator mounted on the caliper.

5 Claims, 13 Drawing Sheets

BRAKE APPARATUS FOR VEHICLE

CROSS-REFERENCE TO RELATED APPLICATIONS

This application claims priority from and the benefit of Korean Patent Application No. 10-2021-0081590, filed on Jun. 23, 2021, which is hereby incorporated by reference for all purposes as if set forth herein.

BACKGROUND

1. Technical Field

Exemplary embodiments of the present disclosure relate to a brake apparatus for a vehicle, and more particularly, to a brake apparatus for a vehicle, which can adjust a position of the gravitational center for stable behavior, and equally adjust the loads of a pair of guide rods.

2. Discussion of Related Art

In general, a brake includes a caliper having a pair of friction pads configured to strongly press a disk, rotated with a wheel, from both sides of the disk. The caliper has an actuator installed therein. Due to the actuator, the gravitational center of the caliper is located at the actuator. The caliper is coupled to a guide rod and slid. Thus, the gravitational center of the caliper needs to be located at a portion supported by the slid guide rod and a torque member, such that the caliper is not vibrated or moved back and forth by vibration or shock applied from the outside of a vehicle, but can have a stable behavior.

In the related art, however, the gravitational center of the caliper is located at the actuator, or located at a position away from the disk. Thus, the behavior of the caliper is destabilized during braking. Thus, there is a demand for a device capable of solving such a problem.

The related art of the present disclosure is disclosed in Korean Patent Application Publication No. 10-2017-0046908 entitled "Disc Brake Apparatus for Vehicles" and published on May 4, 2017.

SUMMARY

Various embodiments are directed to a brake apparatus for a vehicle, which can adjust the position of the gravitational center of a caliper for stable behavior, and equally adjust the loads of a pair of guide rods.

In an embodiment, a brake apparatus for a vehicle may include: a torque member having a pair of brake pads installed therein and spaced apart from each other, and configured to surround a brake disk; a caliper configured to cover the torque member, and having a gravitational center adjuster configured to adjust the position of a gravitational center toward the brake disk; a pair of guide rods configured to connect the torque member and the caliper, such that the caliper is slidably coupled to the torque member; and an actuator mounted on the caliper.

The gravitational center may be located at a sliding support section between an end of the guide rod and the entrance of a guide hole of the torque member.

The caliper may include: a first caliper having a pair of coupling holes to which the guide rods are coupled; a second caliper extended from the first caliper to one side, and having the actuator mounted thereon; a third caliper extended from the first caliper so as to be bent to the other side, and configured to surround the torque member; a fourth caliper extended from the third caliper so as to be bent to the one side, and facing the second caliper; and the gravitational center adjuster connected to the fourth caliper, and configured to adjust the position of the gravitational center.

The gravitational center adjuster may include: a first gravitational center adjusting block protruding from any one of both sides of the fourth caliper to the one side; and a second gravitational center adjusting block protruding from the other of both sides of the fourth caliper to the one side.

The pair of guide rods may include: a first guide rod located so as to face the first gravitational center adjusting block, and coupled to any one of the pair of coupling holes; and a second guide rod located so as to face the second gravitational center adjusting block, and coupled to the other of the pair of coupling holes.

The first gravitational center adjusting block and the second gravitational center adjusting block may have different thicknesses.

The thicknesses of the first and second gravitational center adjusting blocks may be set in proportion to a difference between a distance between a virtual line passing through the gravitational center and a virtual line passing through the center of the first guide rod and a distance between the virtual line passing through the gravitational center and a virtual line passing through the center of the second guide rod.

When the distance between the virtual line passing through the gravitational center and the virtual line passing through the center of the first guide rod is larger than the distance between the virtual line passing through the gravitational center and the virtual line passing through the center of the second guide rod, the thickness of the first gravitational center adjusting block facing the first guide rod may be larger than the thickness of the second gravitational center adjusting block facing the second guide rod.

In the brake apparatus for a vehicle in accordance with the embodiment of the present disclosure, the caliper may include the gravitational center adjuster to adjust the position of the gravitational center. Thus, the brake apparatus may have a stable behavior, and evenly adjust the loads of the pair of guide rods.

DETAILED DESCRIPTION

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
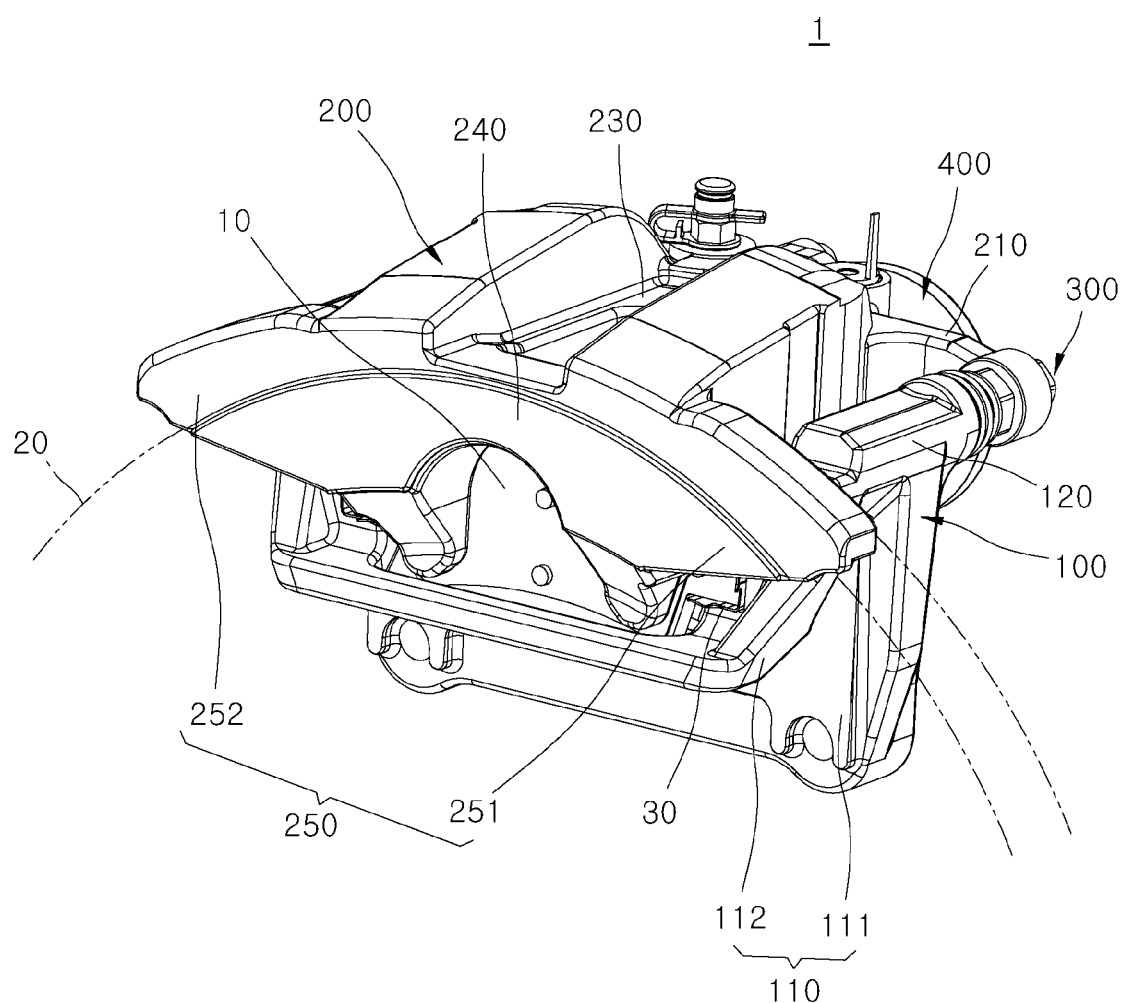
FIG. 1 is a perspective view of a brake apparatus for a vehicle in accordance with an embodiment of the present disclosure.
Figure 2:
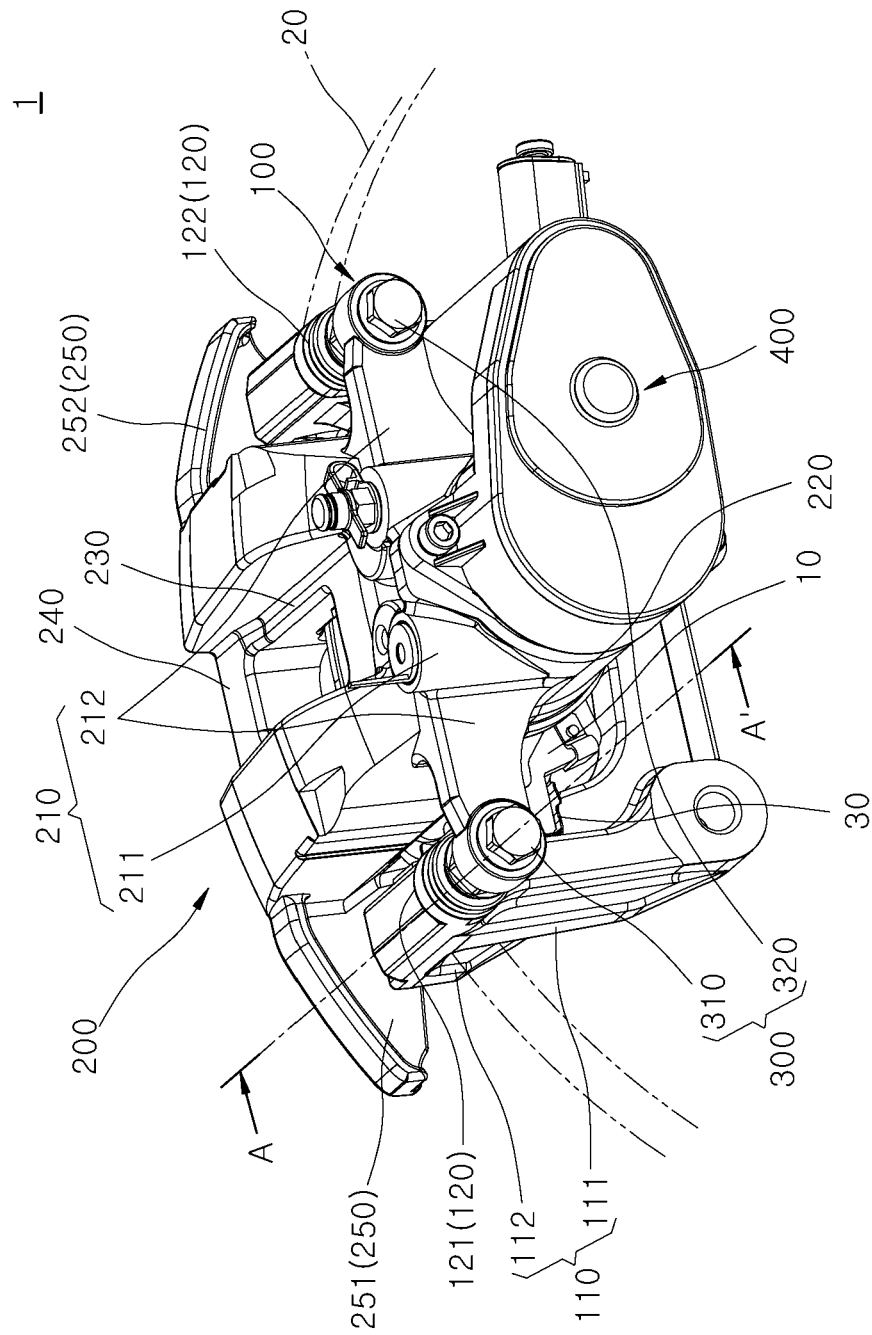
FIG. 2 is a perspective view of the brake apparatus for a vehicle in accordance with the embodiment of the present disclosure, when seen from a different direction.
Figure 3:
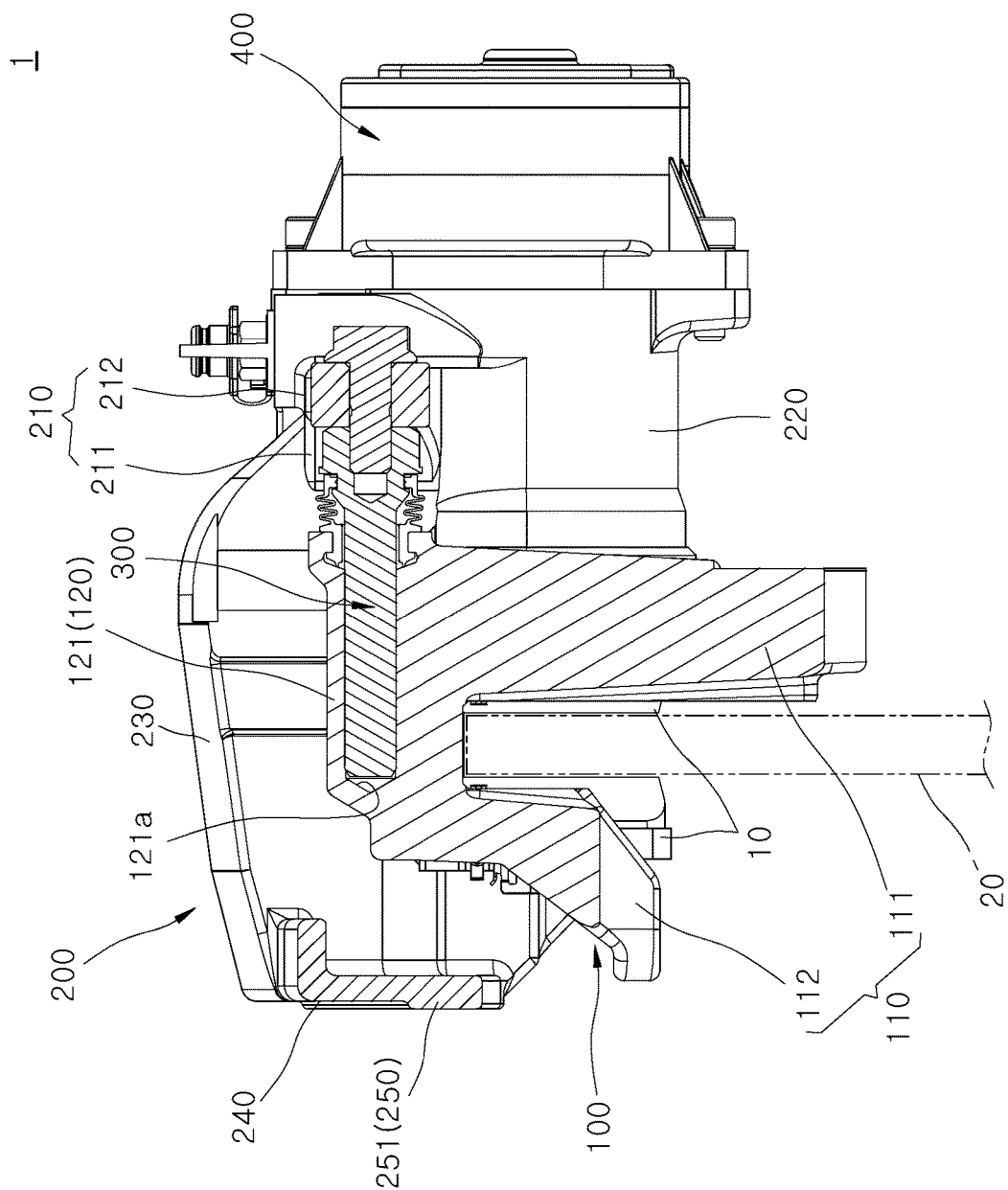
FIG. 3 is a cross-sectional view taken along line A-A' of FIG. 2.
Figure 4:
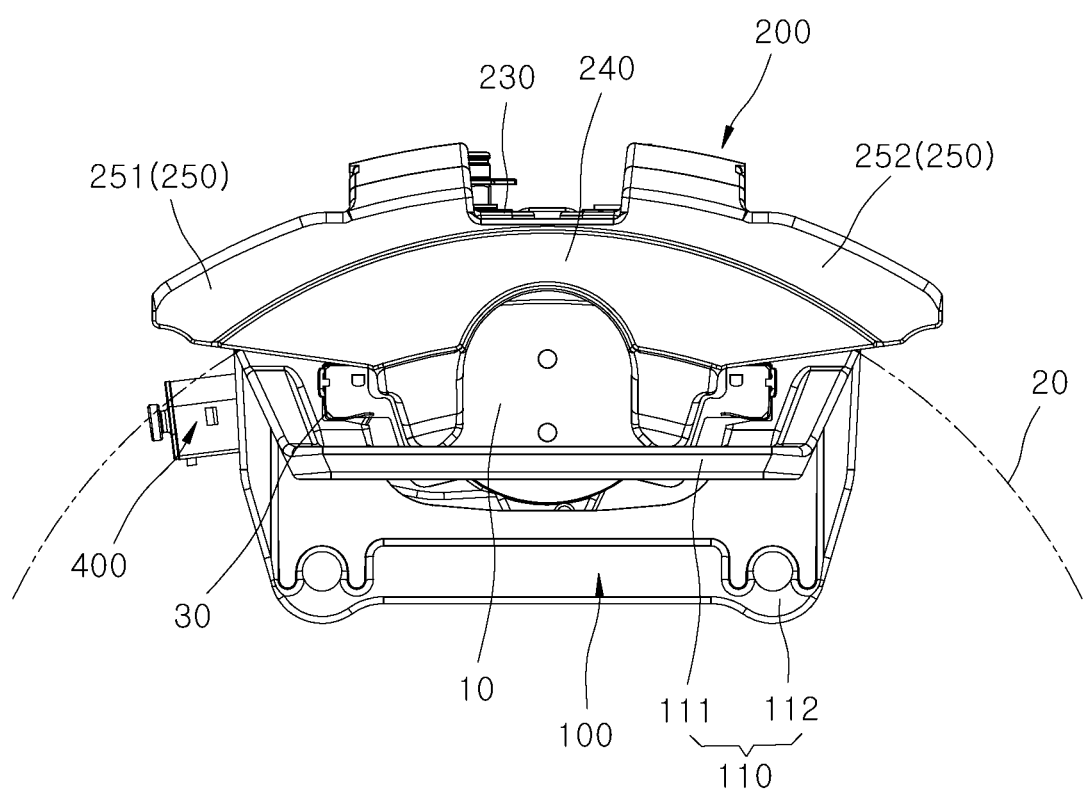
FIG. 4 is a front view of the brake apparatus for a vehicle in accordance with the embodiment of the present disclosure.
Figure 5:
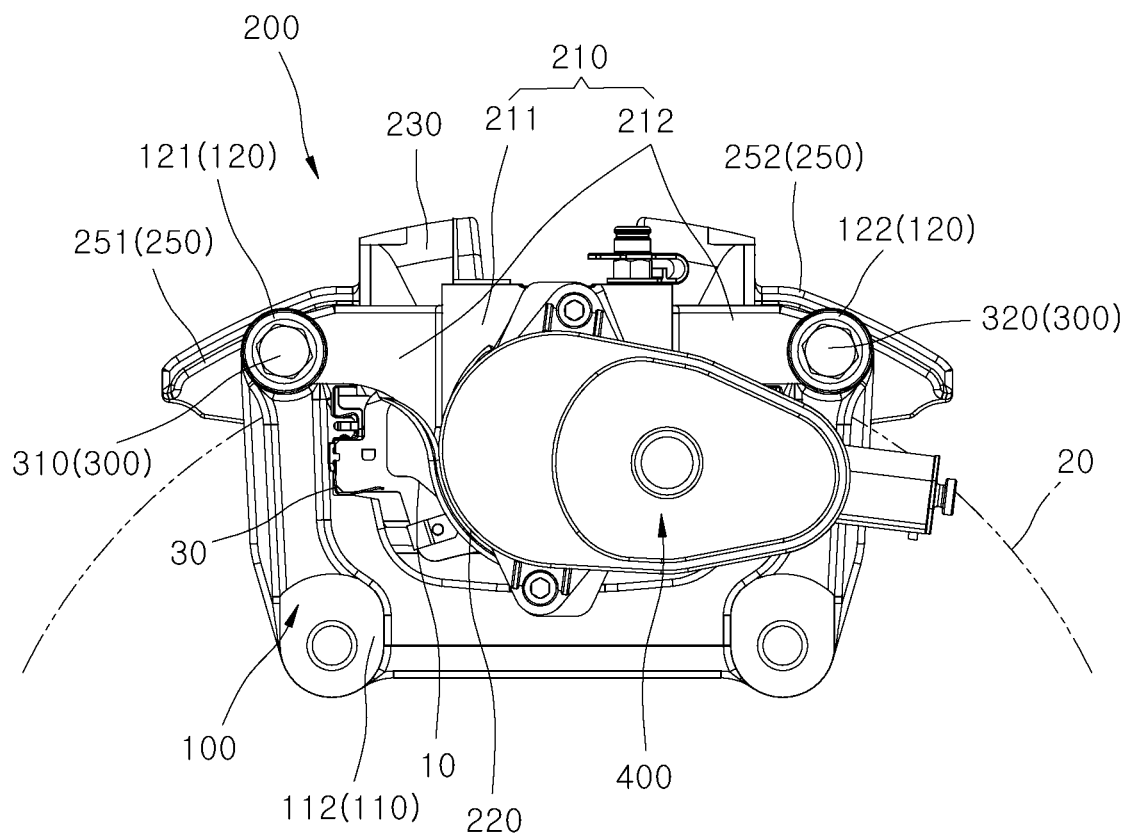
FIG. 5 is a rear view of the brake apparatus for a vehicle in accordance with the embodiment of the present disclosure.
Figure 6:
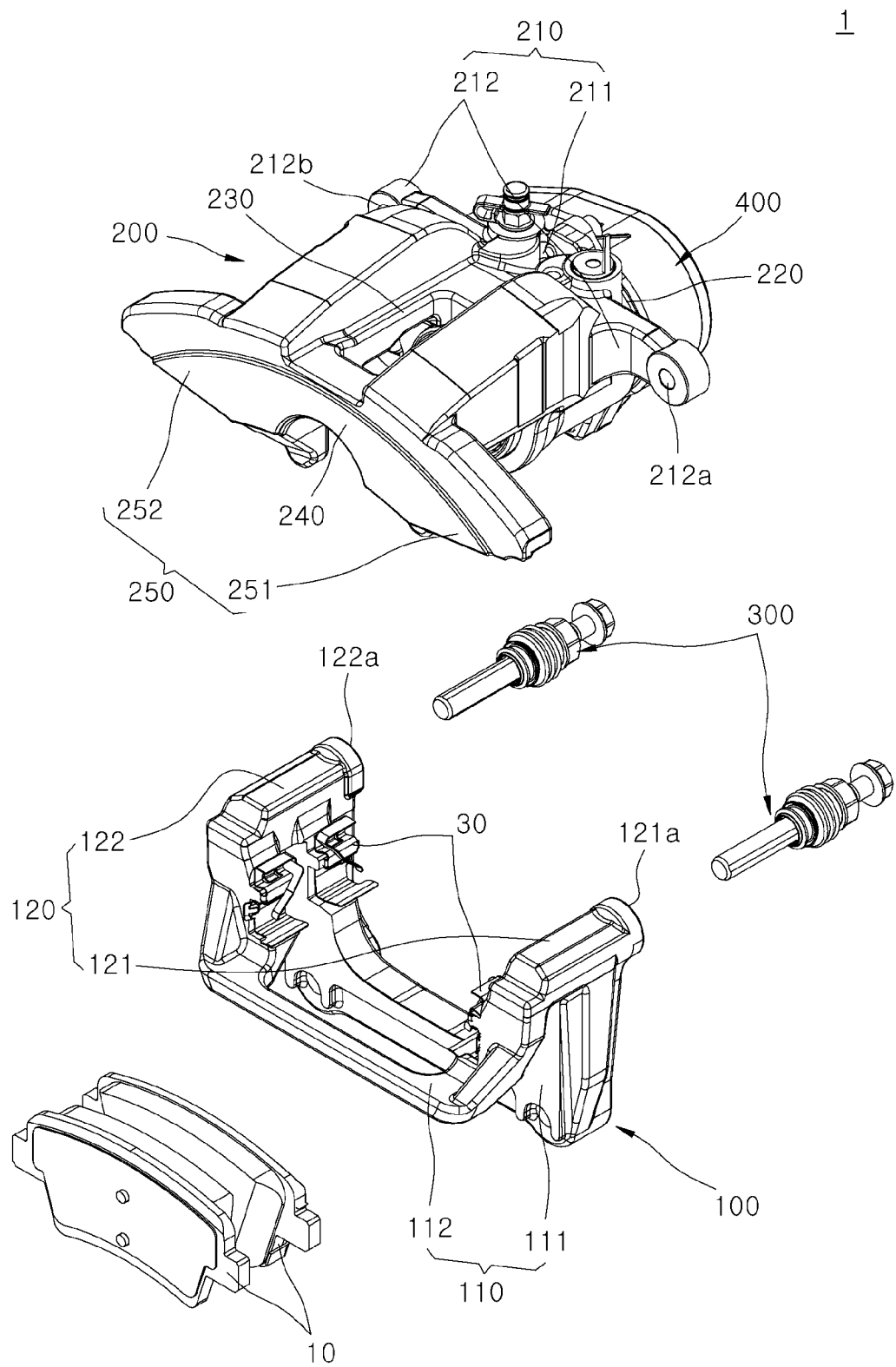
FIG. 6 is an exploded perspective view of the brake apparatus for a vehicle in accordance with the embodiment of the present disclosure.
Figure 7:
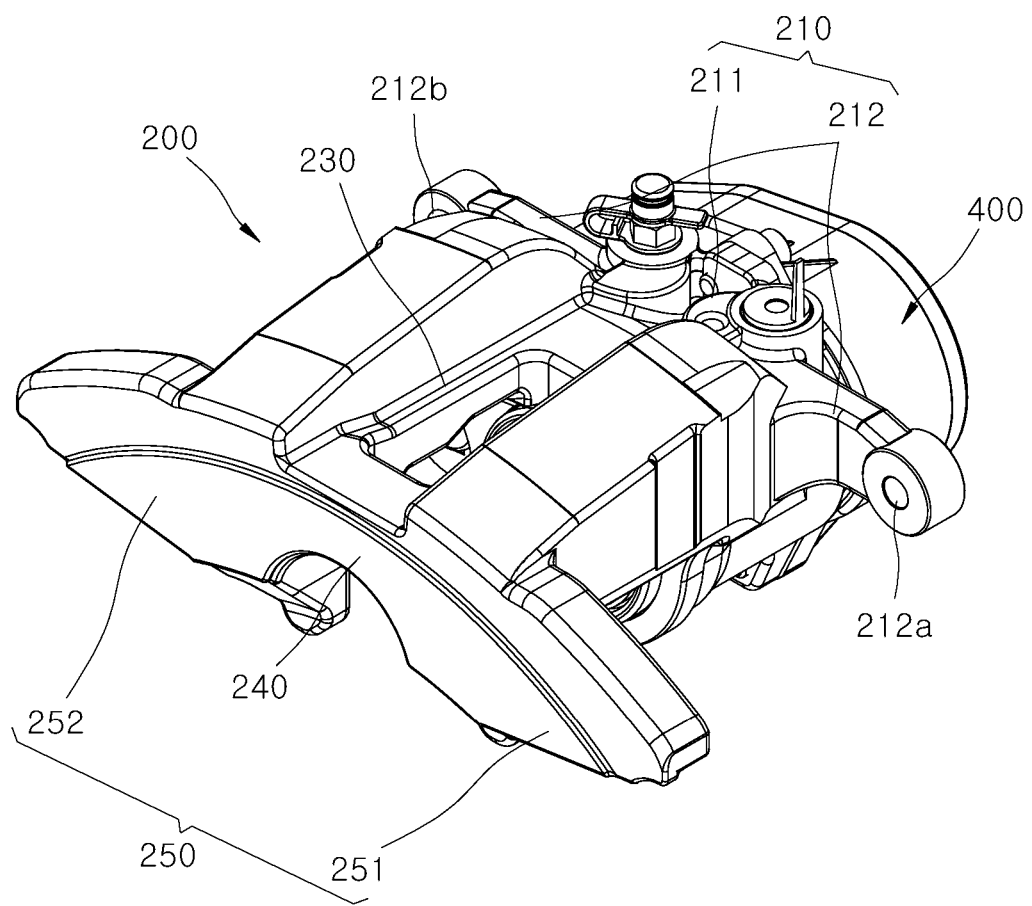
FIG. 7 is an expanded view of main parts of FIG. 6.
Figure 8:
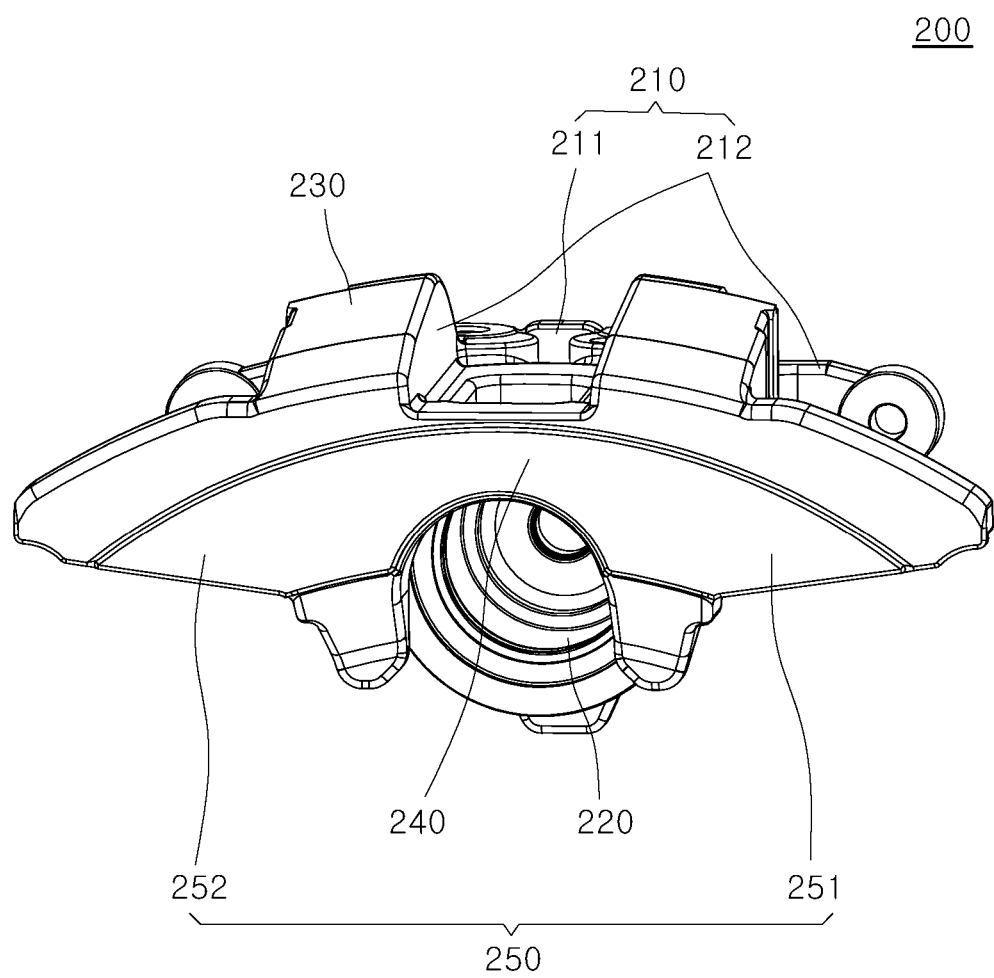
FIG. 8 is a diagram illustrating a caliper of the brake apparatus for a vehicle in accordance with the embodiment of the present disclosure.
Figure 9:
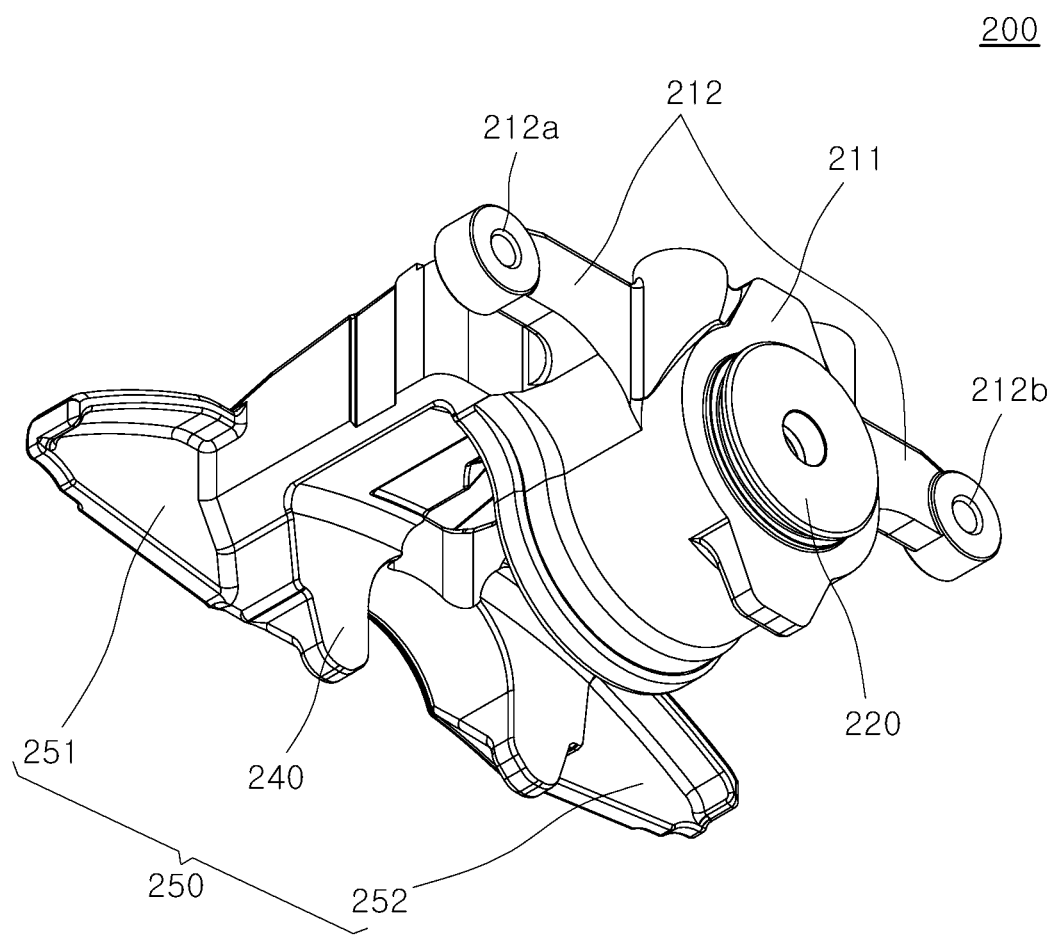
FIG. 9 is a diagram illustrating the caliper of the brake apparatus for a vehicle in accordance with the embodiment of the present disclosure, when seen from a different direction.
Figure 10A:
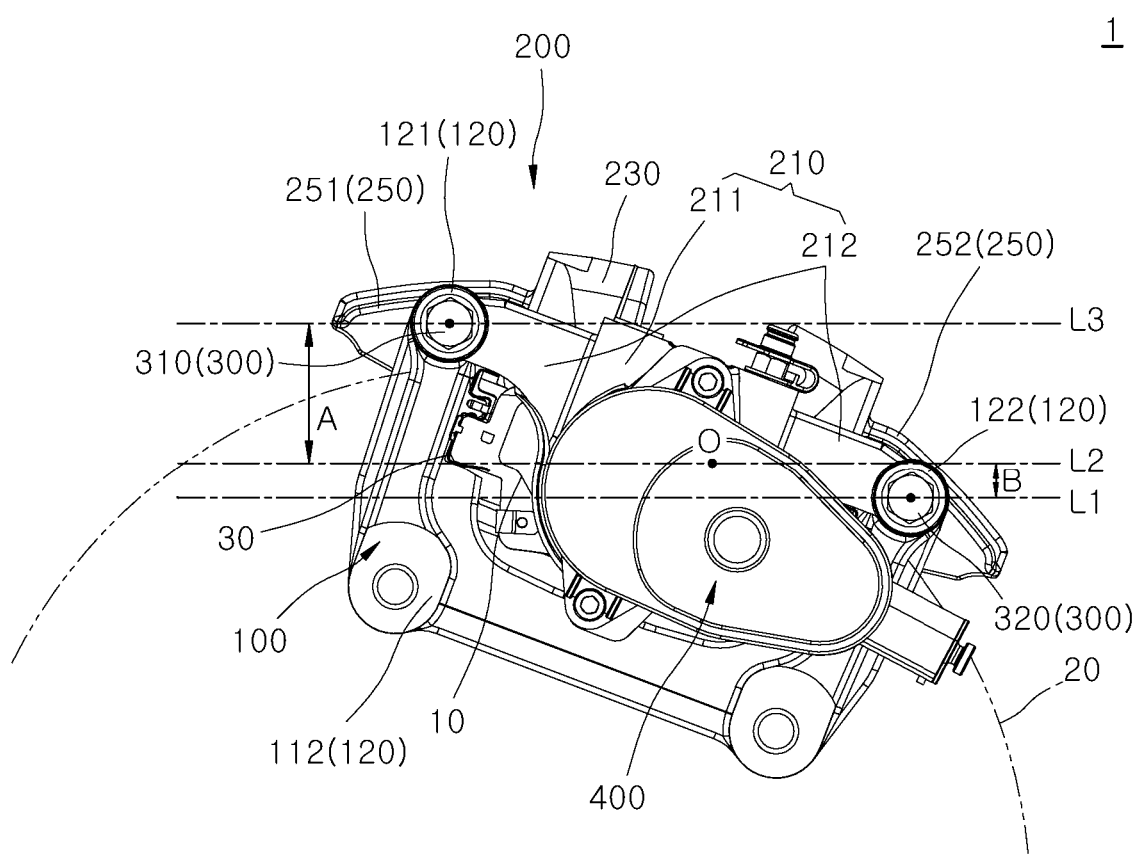
FIGS. 10A and 10B are diagrams illustrating that the thickness of a gravitational center adjuster included in the caliper of the brake apparatus for a vehicle in accordance with the embodiment of the present disclosure is changed.
Figure 10B:
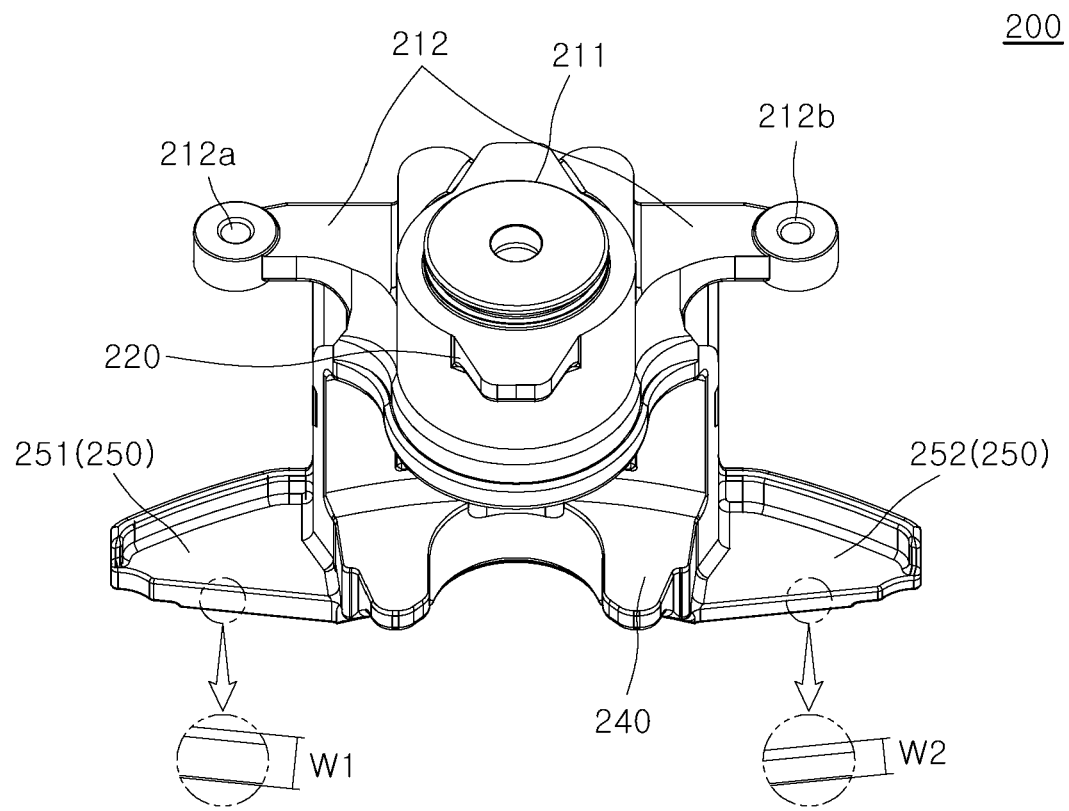
Figure 11A:
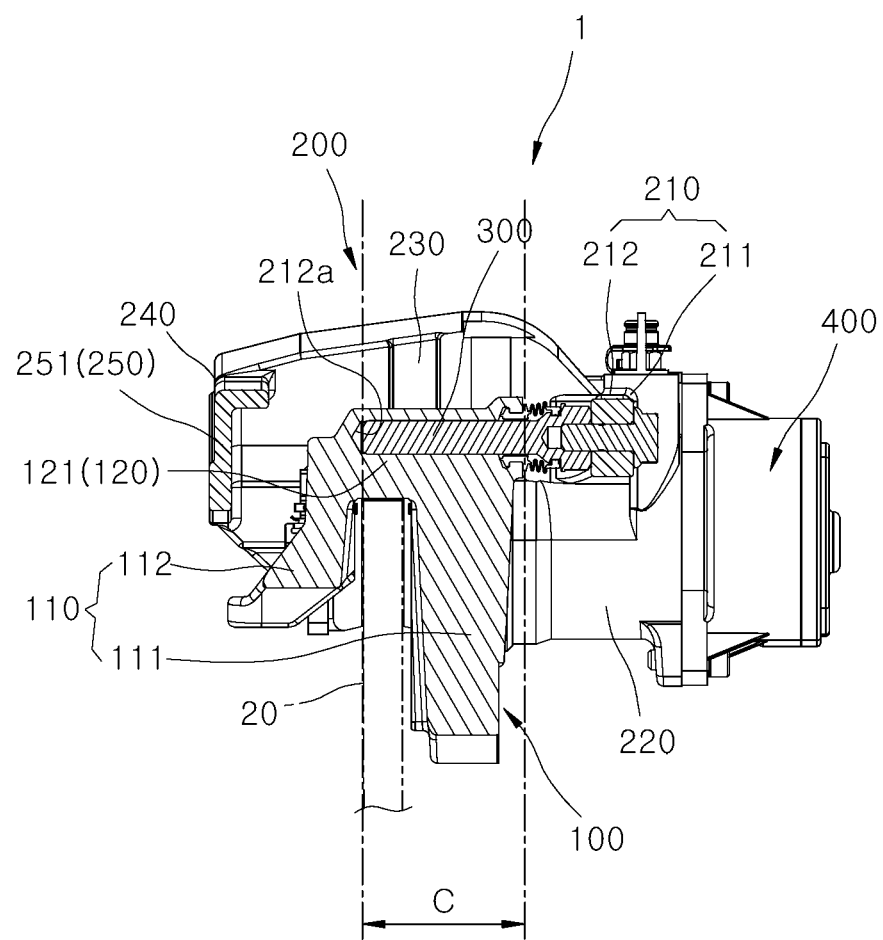
FIGS. 11A and 11B are diagrams schematically illustrating that a gravitational center of the caliper is located at a sliding support section in the brake apparatus for a vehicle in accordance with the embodiment of the present disclosure, even though a brake pad is worn.
Figure 11B:
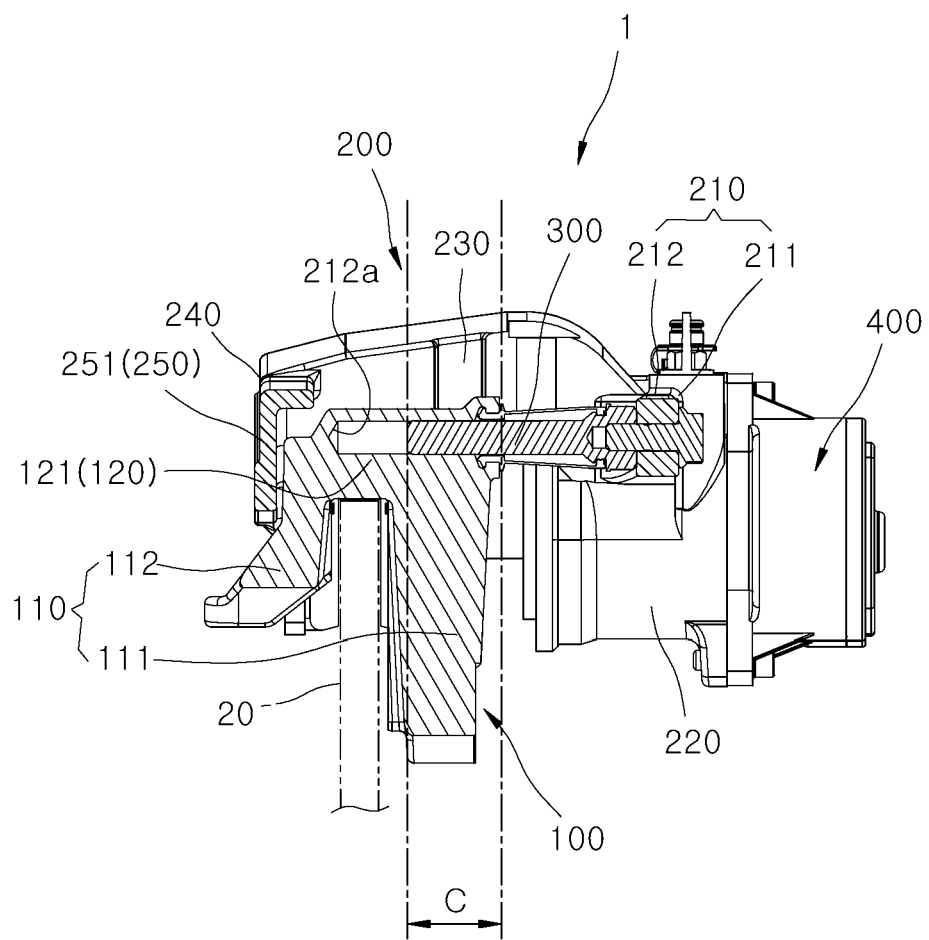

FIG. 1 is a perspective view of a brake apparatus for a vehicle in accordance with an embodiment of the present disclosure, FIG. 2 is a perspective view of the brake apparatus for a vehicle in accordance with the embodiment of the present disclosure, when seen from a different direction, FIG. 3 is a cross-sectional view taken along line A-A' of FIG. 2, FIG. 4 is a front view of the brake apparatus for a vehicle in accordance with the embodiment of the present disclosure, FIG. 5 is a rear view of the brake apparatus for a vehicle in accordance with the embodiment of the present disclosure, FIG. 6 is an exploded perspective view of the brake apparatus for a vehicle in accordance with the embodiment of the present disclosure, FIG. 7 is an expanded view of main parts of FIG. 6, FIG. 8 is a diagram illustrating a caliper of the brake apparatus for a vehicle in accordance with the embodiment of the present disclosure, FIG. 9 is a diagram illustrating the caliper of the brake apparatus for a vehicle in accordance with the embodiment of the present disclosure, when seen from a different direction, FIGS. 10A and 10B are diagrams illustrating that the thickness of a gravitational center adjuster included in the caliper of the brake apparatus for a vehicle in accordance with the embodiment of the present disclosure is changed, and FIGS. 11A and 11B are diagrams schematically illustrating that a gravitational center of the caliper is located at a sliding support section in the brake apparatus for a vehicle in accordance with the embodiment of the present disclosure, even though a brake pad is worn.

Referring to FIGS. 1 to 10B, a brake apparatus 1 for a vehicle in accordance with an embodiment of the present disclosure includes a torque member 100, a caliper 200, a pair of guide rods 300, and an actuator 400.

The torque member 100 has a pair of brake pads 10 installed therein and spaced apart from each other, and surrounds a brake disk 20. The torque member 100 includes a torque member body 110 and a torque member extension 120.

The torque member body 110 surrounds the outside of the brake disk 20. The pair of brake pads 10 are installed in the torque member body 110 so as to be spaced apart from each other.

The torque member body 110 includes a first torque member body 111 and a second torque member body 112. The first torque member body 111 is disposed on one side of the brake disk 20, and connected to the torque member extension 120. Any one of the pair of brake pads 10 is disposed on the first torque member body 111.

The second torque member body 112 is disposed on the other side of the brake disk 20, and connected to the torque member extension 120. The other of the pair of brake pads 10 is disposed on the second torque member body 112.

The torque member extension 120 is connected to the torque member body 110, and has guide holes 121a and 122a formed at ends thereof, respectively. The pair of guide rods 300 are slidably coupled to the respective guide holes 121a and 122a.

The torque member extension 120 includes a first torque member extension 121 and a second torque member extension 122. The first torque member extension 121 connects one end of the first torque member body 111 and one end of the second torque member body 112. The first torque member extension 121 has the first guide hole 121a into which any one of the pair of guide rods 300 is inserted.

The second torque member extension 122 connects the other end of the first torque member body 111 and the other end of the second torque member body 112. The second torque member extension 122 has the second guide hole 122a into which the other of the pair of guide rods 300 is inserted.

The caliper 200 includes a gravitational center adjuster 250 that covers the torque member 100, and adjusts the position of a gravitational center O toward the brake disk 20. As the gravitational center adjuster 250 having a weight is mounted on the caliper 200, the position of the gravitational center O is adjusted toward the brake disk 20 from the actuator 400.

As a result, a stable behavior of the brake apparatus 1 for a vehicle can be secured, and an unnecessary weight may be removed from the torque member 100 and the caliper 200, which makes it possible to reduce the weight of the brake apparatus 1.

The pair of guide rods 300 connect the torque member 100 and the caliper 200, and the caliper 200 is slidably coupled to the torque member 100. The pair of guide rods 300 are respectively inserted into the first and second guide holes 121a and 122a formed at the torque member extension 120 of the torque member 100, i.e. the respective ends of the first and second torque member extensions 121 and 122, and can be moved in the first and second guide holes 121a and 122a, respectively. Thus, the caliper 200 may be slid on the torque member 100.

The actuator 400 includes a motor. The actuator 400 is mounted on the caliper 200, and connected to a screw bar (not illustrated) mounted in the caliper 200 so as to provide power to the screw bar. The screw bar may be rotated by the power received from the actuator 400, and a spindle (not illustrated) may be moved toward the brake pad 10 by the rotation of the screw bar.

The caliper 200 includes a first caliper 210, a second caliper 220, a third caliper 230, a fourth caliper 240, and the gravitational center adjuster 250 (see FIGS. 6 to 9).

The first caliper 210 has a pair of coupling holes 212a and 212b, at which the pair of guide rods 300 are coupled to the first caliper 210. The first caliper 210 includes a first caliper body 211 and a pair of first caliper wings 212. The first caliper body 211 is connected to the second caliper 220. The pair of first caliper wings 212 protrude from both sides of the first caliper body 211 in a first direction, and include the pair of coupling holes 212a and 212b, respectively.

The second caliper 220 is extended from the first caliper 210 in the first direction, and the actuator 400 is mounted on the second caliper 220. The screw bar, the spindle, and a piston (not illustrated), which are coupled to the actuator 400, are installed in the second caliper 220.

The third caliper 230 is extended from the first caliper 210 so as to be bent in the second direction, and covers the torque member 100. The third caliper 230 covers one side of the torque member 100, and surrounds the brake pads 10 and the brake disk 20.

The fourth caliper 240 is extended from the third caliper 230 so as to be bent in the first direction, and faces the second caliper 220. The fourth caliper 240 is disposed in parallel to the second caliper 220.

The gravitational center adjuster 250 is connected to the fourth caliper 240, and adjusts the position of the gravitational center O. The gravitational center adjuster 250 includes a first gravitational center adjusting block 251 and a second gravitational center adjusting block 252.

The first gravitational center adjusting block 251 protrudes from any one of both sides of the fourth caliper 240 in the first direction. The second gravitational center adjusting block 252 protrudes from the other of both sides of the fourth caliper 240 to in the first direction.

The first gravitational center adjusting block 251 and the second gravitational center adjusting block 252 may be located on the same line, and have the same thickness or different thicknesses. Thus, the weights of both sides and the left and right sides of the caliper 200 may be increased. Therefore, the position of the gravitational center O may be adjusted from the actuator 400 having a weight toward the brake disk 20.

The pair of guide rods 300 include a first guide rod 310 and a second guide rod 320.

The first guide rod 310 is located so as to face the first gravitational center adjusting block 251, and coupled to the first caliper 210 at any one of the pair of coupling holes 212a and 212b. The first guide rod 310 is located on the same line as the first gravitational center adjusting block 251, and coupled to the first coupling hole 212a formed in any one of the pair of first caliper wings 212.

The second guide rod 320 is located so as to face the second gravitational center adjusting block 252, and coupled to the first caliper 210 at the other of the pair of coupling holes 212a and 212b. The second guide rod 320 is located on the same line as the second gravitational center adjusting block 252, and coupled to the second coupling hole 212b formed in the other of the pair of first caliper wings 212.

The first gravitational center adjusting block 251 and the second gravitational center adjusting block 252 have different thicknesses from each other. As illustrated in FIGS. 10A and 10B, the thicknesses of the first and second gravitational center adjusting blocks 251 and 252 are set in proportion to a difference between a distance A between a virtual line L2 passing through the gravitational center O and a virtual line L3 passing through the center of the first guide rod 310 and a distance B between the virtual line L2 passing through the gravitational center O and a virtual line L1 passing through the center of the second guide rod 320. Thus, the gravitational center O may be adjusted to equalize the loads of the pair of the pair of guide rods 300.

For example, when the distance A between the virtual line L2 passing through the gravitational center O and the virtual line L3 passing through the center of the first guide rod 310 is larger than the distance B between the virtual line L2 passing through the gravitational center O and the virtual line L1 passing through the center of the second guide rod 320, the thickness W1 of the first gravitational center adjusting block 251 facing the first guide rod 310 may be larger than the thickness W2 of the second gravitational center adjusting block 252 facing the second guide rod 320.

At this time, the first gravitational center adjusting block 251 and the second gravitational center adjusting block 252 may be symmetrical with each other, but have different thicknesses. Therefore, it is possible to remove a difference in load between the pair of guide rods 300, which may occur due to a difference between the gravitational center and the mounting angle of the brake apparatus 1 for a vehicle.

In the present disclosure, it is illustrated that the first and second gravitational center adjusting blocks 251 and 252 of the gravitational center adjuster 250 have different thicknesses to remove a difference in load between the pair of guide rods 300. However, the present disclosure is not limited thereto, but may be variously changed in design. For example, the shapes of the first and second gravitational center adjusting blocks 251 and 252 may be asymmetrically formed so that the first and second gravitational center adjusting blocks 251 and 252 have different weights.

As illustrated in FIGS. 11A and 11B, the gravitational center O is located at a sliding support section C between the end of the guide rod 300 and the entrances of the guide holes 121a and 122a of the torque member 100.

As the gravitational center adjuster 250 having a weight is mounted on the fourth caliper 240 of the caliper 200, the position of the gravitational center O is adjusted to the front of the caliper 200 (based on FIGS. 11A and 11B). In other words, the position of the gravitational center O is adjusted from the actuator 400 having a weight toward the brake disk 20.

That is, the gravitational center O may be located at the sliding support section C. Furthermore, although the pair of brake pads 10 are worn, the gravitational center O may be located at the sliding support section C. As a result, the brake apparatus 1 for a vehicle may have a stable behavior.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:
1. A brake apparatus for a vehicle, comprising:
a torque member surrounding a brake disk and having a pair of brake pads spaced apart from each other;
a caliper covering the torque member and having at least one gravitational center adjuster block configured to adjust a position of a gravitational center of the caliper toward the brake disk;
a pair of guide rods configured to connect the torque member and the caliper such that the caliper is slidably coupled to the torque member; and
an actuator mounted on the caliper,
wherein the caliper comprises:
a first caliper portion having a pair of coupling holes at which the pair of guide rods is coupled to the first caliper portion;

a second caliper portion extending from the first caliper portion in a first direction, wherein the actuator is mounted on the second caliper portion;

a third caliper portion extending from the first caliper portion, bent in a second direction and surrounding the torque member;

a fourth caliper portion extending from the third caliper portion, bent in the first direction and facing the second caliper portion; and the at least one gravitational center block connected to the fourth caliper portion and configured to adjust the position of the gravitational center of the caliper, and wherein the at least one gravitational center block comprises:

a first gravitational center adjusting block protruding from a first side of the fourth caliper portion in the first direction, a second gravitational center adjusting block protruding from a second side of the fourth caliper portion in the second direction, and the first gravitational center adjusting block has a first thickness different from that of the second gravitational center adjusting block.

2. The brake apparatus of claim 1, wherein the gravitational center is located at a sliding support section positioned between an end of the pair of guide rods and an entrance of a guide hole of the torque member.

3. The brake apparatus of claim 1, wherein the pair of guide rods comprises:

a first guide rod facing the first gravitational center adjusting block and coupled to the first caliper at a first coupling hole of the pair of coupling holes of the first caliper; and a second guide rod facing the second gravitational center adjusting block and coupled to the first caliper at a second coupling hole of the pair of coupling holes of the first caliper.

4. The brake apparatus of claim 1, wherein the first and second thicknesses of the first and second gravitational center adjusting blocks are set in proportion to a difference between (1) a first distance between a first virtual line passing through the gravitational center of the caliper and a second virtual line passing through a center of the first guide rod, and (2) a second distance between the first virtual line passing through the gravitational center of the caliper and a third virtual line passing through a center of the second guide rod.

5. The brake apparatus of claim 4, wherein, when the first distance is larger than the second distance, the first thickness of the first gravitational center adjusting block is set to be larger than the second thickness of the second gravitational center adjusting block.

* * * * *